(12) United States Patent
Shiraishi et al.

(10) Patent No.: US 11,385,534 B2
(45) Date of Patent: Jul. 12, 2022

(54) TRANSPARENT SCREEN, TRANSPARENT SCREEN ASSEMBLY, MANUFACTURING METHOD OF TRANSPARENT SCREEN, AND MANUFACTURING METHOD OF TRANSPARENT SCREEN ASSEMBLY

(71) Applicant: AGC Inc., Tokyo (JP)

(72) Inventors: Ryuichi Shiraishi, Tokyo (JP); Yuriko Kaida, Tokyo (JP); Yoshinori Iguchi, Tokyo (JP); Yukihiro Tao, Tokyo (JP)

(73) Assignee: AGC Inc., Tokyo (JP)

( * ) Notice: Subject to any disclaimer, the term of this patent is extended or adjusted under 35 U.S.C. 154(b) by 0 days.

(21) Appl. No.: 17/225,190

(22) Filed: Apr. 8, 2021

(65) Prior Publication Data

US 2021/0223676 A1 Jul. 22, 2021

Related U.S. Application Data

(63) Continuation of application No. 15/905,880, filed on Feb. 27, 2018, now Pat. No. 11,022,873, which is a
(Continued)

(30) Foreign Application Priority Data

Sep. 3, 2015 (JP) ............................. JP2015-173639

(51) Int. Cl.
*G03B 21/62* (2014.01)
*G02B 5/02* (2006.01)
(Continued)

(52) U.S. Cl.
CPC .............. *G03B 21/62* (2013.01); *G02B 5/02* (2013.01); *G02B 5/08* (2013.01); *G03B 21/56* (2013.01); *G03B 21/60* (2013.01); *B29D 11/00* (2013.01)

(58) Field of Classification Search
CPC ........ G03B 21/62; G03B 21/56; G03B 21/60; G02B 5/02; G02B 5/0226; G02B 5/0242
See application file for complete search history.

(56) References Cited

U.S. PATENT DOCUMENTS

| 4,473,355 A | 9/1984 | Pongratz |
| 6,347,012 B1 | 2/2002 | Monson et al. |

(Continued)

FOREIGN PATENT DOCUMENTS

| EP | 0 990 941 A2 | 4/2000 |
| JP | S56-501386 | 9/1981 |

(Continued)

OTHER PUBLICATIONS

International Search Report dated Nov. 1, 2016 in PCT/JP2016/073892 filed Aug. 16, 2016 (with English Translation).
(Continued)

*Primary Examiner* — Christopher E Mahoney
(74) *Attorney, Agent, or Firm* — Oblon, McClelland, Maier & Neustadt, L.L.P.

(57) ABSTRACT

A transparent screen includes a plurality of transparent plates arranged in a front-rear direction; and a screen main body, interposed between the transparent plates, configured to display video images projected from a front side or a rear side of the transparent screen to a user on the front side, and enable a rear background to be visually recognized by the user. In a cross section orthogonal to a part of an outer edge of the transparent screen, the transparent screen has a curved shape, and a length of a center line in a plate thickness direction of the transparent plate on an external side of the screen main body in a curvature radius direction of the curved shape is greater than a length of a center line of the transparent plate on an internal side of the screen main body.

20 Claims, 9 Drawing Sheets

Related U.S. Application Data continuation of application No. PCT/JP2016/073892, filed on Aug. 16, 2016.

(51) Int. Cl.
  *B29D 11/00* (2006.01)
  *G03B 21/56* (2006.01)
  *G02B 5/08* (2006.01)
  *G03B 21/60* (2014.01)

(56) References Cited

U.S. PATENT DOCUMENTS

| | | |
|---|---|---|
| 6,866,918 B2 | 3/2005 | Sauer |
| 7,715,103 B2 | 5/2010 | Sprague et al. |
| 7,777,960 B2 | 8/2010 | Freeman |
| 8,049,960 B1 | 11/2011 | Ligon |
| 8,300,311 B2 | 10/2012 | Jelusic et al. |
| 2003/0161997 A1 | 8/2003 | Moran |
| 2011/0073773 A1 | 3/2011 | Labrot et al. |
| 2012/0319999 A1 | 12/2012 | Kamiya |
| 2014/0104690 A1 | 4/2014 | Sandre-Chardonnal |
| 2014/0232707 A1 | 8/2014 | Alschinger et al. |
| 2015/0138627 A1 | 5/2015 | Ehrensperger et al. |
| 2015/0375493 A1 | 12/2015 | Wang et al. |
| 2016/0011342 A1 | 1/2016 | Griffin |
| 2016/0282522 A1 | 9/2016 | Schiavoni et al. |
| 2017/0059982 A1* | 3/2017 | Watanabe .............. G03B 21/62 |
| 2017/0082915 A1 | 3/2017 | Tao et al. |
| 2017/0176847 A1 | 6/2017 | Vermeirsch et al. |
| 2017/0351009 A1* | 12/2017 | Matsuo ................ G03B 21/625 |

FOREIGN PATENT DOCUMENTS

| | | |
|---|---|---|
| JP | H06-118510 | 4/1994 |
| JP | 2001-075178 | 3/2001 |
| JP | 2002-131842 | 5/2002 |
| JP | 2012-032513 | 2/2012 |
| JP | 2012-159646 | 8/2012 |
| JP | 2014-509963 | 4/2014 |
| JP | 2014-095771 | 5/2014 |
| WO | WO 81/001214 A1 | 4/1981 |
| WO | WO 2012/104547 A1 | 8/2012 |
| WO | WO 2013/175129 A1 | 11/2013 |
| WO | WO 2015/119192 A1 | 8/2015 |

OTHER PUBLICATIONS

Written Opinion dated Nov. 1, 2016 in PCT/JP2016/073892 filed Aug. 16, 2016.

* cited by examiner

TRANSPARENT SCREEN, TRANSPARENT SCREEN ASSEMBLY, MANUFACTURING METHOD OF TRANSPARENT SCREEN, AND MANUFACTURING METHOD OF TRANSPARENT SCREEN ASSEMBLY

CROSS-REFERENCE TO RELATED APPLICATION

The present application is a continuation of U.S. application Ser. No. 15/905,880, filed on Feb. 27, 2018, which is a continuation application filed under 35 U.S.C. 111(a) claiming benefit under 35 U.S.C. 120 and 365(c) of PCT International Application No. PCT/JP2016/073892 filed on Aug. 16, 2016 and designating the U.S., which claims priority of Japanese Patent Application No. 2015-173639 filed on Sep. 3, 2015. The entire contents of the foregoing applications are incorporated herein by reference.

BACKGROUND OF THE INVENTION

1. Field of the Invention

The disclosure herein generally relates to a transparent screen, a transparent screen assembly, a manufacturing method of a transparent screen, and a manufacturing method of a transparent screen assembly.

2. Description of the Related Art

A typical screen displays video images projected from a front side of the screen or from a rear side of the screen to a user on the front side of the screen. Because the screen is dedicated for displaying video images, the user cannot view a rear background behind the rear side of the screen (See Japanese Unexamined Patent Application Publication No. 2012-032513).

SUMMARY OF THE INVENTION

Technical Problem

There is a problem that in the process of development of a transparent screen, through which a user can view a rear background behind a rear side of the screen, when a shape of the transparent screen is changed from a flat shape to a curved shape, a great difference in extent occurs on an end surface of the transparent screen.

FIG. 1 is a cross-sectional view of a transparent screen according to a related art. A side of the transparent screen 120 closer to a user 110 will be referred to as a front side, and a side of the transparent screen 120 farther from the user 110 will be referred to as a rear side. A left part of FIG. 1 is the front side, and a right part of FIG. 1 is the rear side. The left part may be the rear side and the right part may be the front side. That is, in FIG. 1, the user 110 is present on the left side of the transparent screen 120. The user 110 may be present on the right side of the transparent screen 120.

The transparent screen 120 displays video images projected from the front side of the screen or from the rear side of the screen to the user 110 on the front side of the screen, and causes the user 110 to view a rear background behind the rear side of the screen. The transparent screen 120 has, for example, a rectangular shape viewed in a front-rear direction.

The transparent screen 120 has a curved shape. In FIG. 1, the transparent screen 120 has a convex shape toward the user 110. However, the transparent screen 120 may have a concave shape toward the user 110.

As illustrated in FIG. 1, in a cross section orthogonal to a part of an outer edge of the transparent screen 120, the transparent screen 120 has a curved shape. Here, the "curved shape" includes a shape of arc, a shape of elliptical arc, and the like.

The transparent screen 120 includes a plurality of transparent plates 130, 140 arranged in the front-rear direction, and a screen main body 150 interposed between the plurality of transparent plates 130, 140. The plurality of transparent plates 130, 140 hold the screen main body 150 from both sides in the front-rear direction, to protect the screen main body 150 from both sides in the front-rear direction. The screen main body 150 displays video images projected from the front side of the screen or from the rear side of the screen to the user 110 on the front side of the screen, and causes the user 110 to view a rear background behind the rear side of the screen. The transparent screen 120 is held by a holding member 160.

The holding member 160 includes an exterior side surface holding part 161 and an interior side surface holding part 162. The exterior side surface holding part 161 holds an exterior main surface of the transparent screen 120 in the curvature radius direction. The term "exterior surface in the curvature radius direction" means a surface, out of two surfaces in a direction normal to the transparent screen 120, which is farther from a center of curvature. The interior side surface holding part 162 holds an interior main surface of the transparent screen 120 in the curvature radius direction. The term "interior surface in the curvature radius direction" means a surface, out of two surfaces in a direction normal to the transparent screen 120, which is closer to the center of curvature.

The plurality of transparent plates 130, 140 are obtained by bending a plurality of transparent flat plates having main surfaces of the same size into curved shapes on heating. The size of the main surface can be read as a size of a center plane in a plate thickness direction. Because there is only little tensile stress and compression stress applied to the center plane in the plate thickness direction when the transparent plates are bent in curved shapes, the size of the center plane in the plate thickness direction little changes before and after the bending.

In the cross section, illustrated in FIG. 1, the transparent screen 120 has a curved shape, and a length of a center line in the plate thickness direction 131 of the transparent plate 130 on an exterior side in the curvature radius direction is the same as a length of a center line in the plate thickness direction 141 of the transparent plate 140 on an interior side in the curvature radius direction. A center line in a plate thickness direction is a line that bisects a plate in a plate thickness direction. The length of the center line in the plate thickness direction is measured along the center line in the plate thickness direction having a curved shape.

In the cross section illustrated in FIG. 1, when the lengths of the center lines in the plate thickness direction 131, 141 of the plurality of transparent plates 130, 140 are the same, a great difference in extent D occurs on end surfaces of the plurality of transparent plates 130, 140. In this case, when both main surfaces of the transparent screen 120 are held equally, as illustrated in FIG. 1, the exterior side surface holding part 161 reduces the rear background which can be viewed through the transparent screen 120. In this case, when the exterior side surface holding part 161 is made shorter in order to secure a sufficient size of the rear background which can be viewed through the transparent screen 120, sufficient size of the main exterior surface of the transparent screen 120 in the curvature radius direction cannot be secured, and the transparent screen 120 becomes unstable.

The present invention was made in view of the aforementioned problem, and mainly aims at providing a curved transparent screen, through which a sufficient size of a rear background can be viewed, and which can be held with stability.

Solution to Problem

In order to solve the aforementioned problem, an aspect of the present invention provides a transparent screen including a plurality of transparent plates arranged in a front-rear direction; and a screen main body, interposed between the plurality of transparent plates, configured to display video images projected from a front side of the transparent screen or from a rear side of the transparent screen to a user on the front side, and configured to enable a rear background to be visually recognized by the user.

In a cross section orthogonal to a part of an outer edge of the transparent screen, the transparent screen having a curved shape, and a length of a center line in a plate thickness direction of the transparent plate on an external side of the screen main body in a curvature radius direction of the curved shape being greater than a length of a center line in a plate thickness direction of the transparent plate on an internal side of the screen main body in the curvature radius direction.

Effect of Invention

According to an aspect of the present invention, a curved transparent screen, through which a sufficient size of a rear background can be visually recognized, and which can be held with stability is provided.

DETAILED DESCRIPTION OF THE PREFERRED EMBODIMENTS

Figure 1:
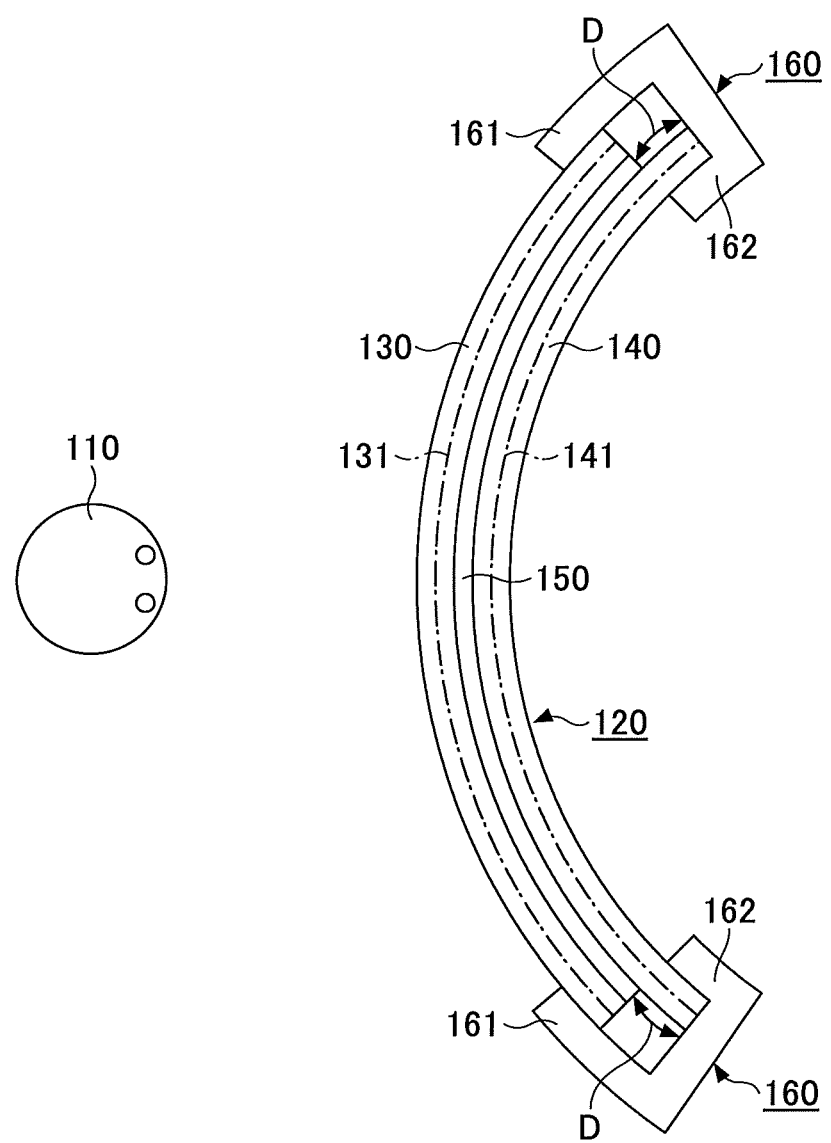
FIG. 1 is a cross-sectional view depicting a transparent screen according to a related art.

In the following, with reference to drawings, embodiments for implementing the present invention will be described. In each drawing, the same or corresponding reference numeral is assigned to the same or corresponding component, and an explanation will be omitted.

Figure 2:
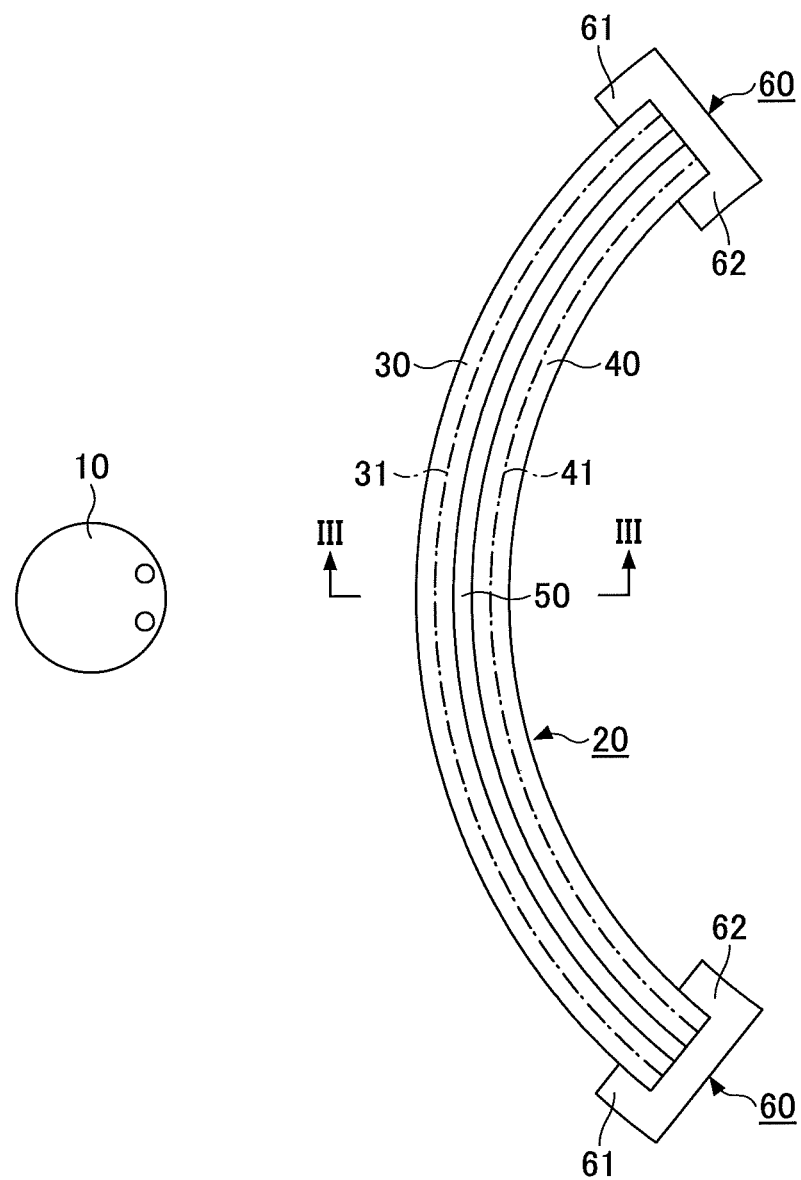
FIG. 2 is a cross-sectional view depicting a transparent screen according to an embodiment.
Figure 3:
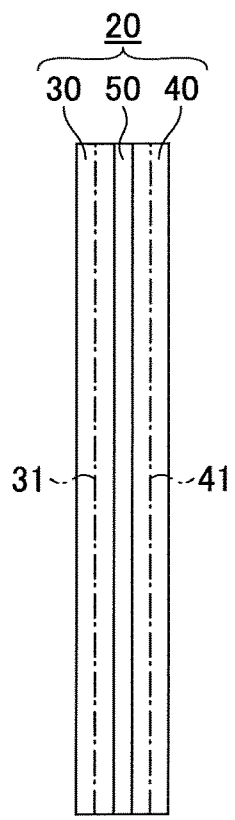
FIG. 3 is a cross-sectional view depicting the transparent screen illustrated in FIG. 2, cut along a III-III line.

FIG. 2 is a cross-sectional view depicting a transparent screen according to an embodiment. FIG. 3 is a cross-sectional view depicting the transparent screen cut along a III-III line, illustrated in FIG. 2. A side of the transparent screen 20 closer to a user 10 will be referred to as a front side, and a side of the transparent screen 20 farther from the user 10 will be referred to as a rear side. In each of FIGS. 2 and 3, a left part of the drawing is the front side, and a right part of the drawing is the rear side. The left part may be the rear side and the right part may be the front side. That is, in each of FIGS. 2 and 3, the user 10 is present on the left side of the transparent screen 20. The user 10 may be present on the right side of the transparent screen 20.

The transparent screen 20 displays video images projected from the front side of the screen or from the rear side of the screen to the user 10 on the front side of the screen, and enables the rear background to be visually recognized by the user 10. The transparent screen 20 is only required to be capable of enabling the rear background to be visually recognized at least in the case where video images are not projected. In the case where video images are projected, the transparent screen 20 may enable the rear background to be visually recognized by the user 10, or may not enable the rear background to be visually recognized by the user 10. The transparent screen 20 has, for example, a rectangular shape visually recognized in a front-rear direction.

Note that, the transparent screen 20 according to the embodiment has an approximately front-rear shape visually recognized in the front-rear direction. For example, the shape may be an approximately triangular shape, a circular shape, or the like. The shape may be of great variety.

The transparent screen 20 has a curved shape. In FIG. 2, the transparent screen 20 has a convex shape toward the user 10. However, the transparent screen 20 may have a concave shape toward the user 10.

As illustrated in FIG. 2, in a first cross section orthogonal to a part of an outer edge of the transparent screen 20, the transparent screen 20 has a curved shape. In the specification of the present application, the "outer edge" is an outer edge of a main surface. Moreover, the "curved shape" includes a shape of arc, a shape of elliptical arc, and the like.

As illustrated in FIG. 3, in a second cross section orthogonal to another part of the outer edge of the transparent screen 20, the transparent screen 20 has a flat shape. The first cross section illustrated in FIG. 2 and the second cross section illustrated in FIG. 3 are cross sections orthogonal to each other.

The transparent screen 20 includes a plurality of transparent plates 30, 40 arranged in the front-rear direction, and a screen main body 50 interposed between the plurality of transparent plates 30, 40. The transparent screen 20 is held by a holding member 60.

Each of the plurality of transparent plates 30, 40 has a main surface and an end surface orthogonal to the main surface. Each of the plurality of transparent plates 30, 40 may have an oblique surface (not shown) in a boundary portion between the main surface and the end surface. The oblique surface is formed by a chamfering or the like, and is oblique with respect to both the main surface and the end surface.

The plurality of transparent plates 30, 40 hold the screen main body 50 from both sides in the front-rear direction, to protect the screen main body 50 from both sides in the front-rear direction. The plurality of transparent plates 30, 40 are, for example, glass plates, respectively. A laminated glass can be configured of a plurality of glass plates, and a screen main body 50 interposed between the glass plates.

Each of the plurality of glass plates, in which the screen main body 50 is interposed, may be a non-strengthened glass or may be a strengthened glass. The non-strengthened glass is obtained by forming a molten glass into a shape of plate, and cooling the glass slowly. The method of forming includes a float method, a fusion method and the like. The strengthened glass may be a physically strengthened glass or a chemically strengthened glass. The physically strengthened glass is obtained by rapidly cooling a uniformly heated glass plate from a temperature around a softening temperature so that a compression stress is generated on a glass surface according to a difference between a temperature of the glass surface and a temperature inside the glass, and thereby the glass surface is strengthened. The chemically strengthened glass is obtained by generating a compression stress on a glass surface according to an ion exchange process or the like, and thereby the glass surface is strengthened.

When at least one glass plate of the plurality of glass plates, in which the screen main body 50 is interposed, is a strengthened glass, a durability of the transparent screen 20 can be enhanced.

In the case where among the plurality of glass plates, in which the screen main body 50 is interposed, a glass plate arranged on the front side of the screen main body 50 is a strengthened glass, and a glass plate arranged on the rear side of the screen main body 50 is a non-strengthened glass, when the non-strengthened glass is broken by a flying object from the rear side, the screen function can be maintained. This is because the non-strengthened glass is less likely to shatter into small pieces as compared to the strengthened glass.

In the case where among the plurality of glass plates, in which the screen main body 50 is interposed, a glass plate arranged on the rear side of the screen main body 50 is a strengthened glass, and a glass plate arranged on the front side of the screen main body 50 is a non-strengthened glass, when the non-strengthened glass is broken by a flying object from the front side, the screen function can be maintained. This is because the non-strengthened glass is less likely to shatter into small pieces as compared to the strengthened glass.

Note that when each of the plurality of glass plates, in which the screen main body 50 is interposed, is a strengthened glass, a probability of breakage by a flying object can be minimized.

Note that the transparent plates 30, 40 according to the embodiment are glass plates, respectively. However, the transparent plates 30, 40 may be resin plates. Moreover, among the plurality of transparent plates 30, 40, one plate may be a glass plate and the other plate may be a resin plate.

The screen main body 50 displays video images projected from the front side of the screen or from the rear side of the screen to the user 10 on the front side of the screen, and enable a rear background to be visually recognized by the user 10. A configuration of the screen main body 50 will be specifically described later.

The holding member 60 has an exterior side surface holding part 61 and an interior side surface holding part 62. The exterior side surface holding part 61 holds an exterior main surface of the transparent screen 20 in the curvature radius direction. The term "exterior surface in the curvature radius direction" means a surface, out of two surfaces in a direction normal to the transparent screen 20, which is farther from a center of curvature. The interior side surface holding part 62 holds an interior main surface of the transparent screen 20 in the curvature radius direction. The term "interior surface in the curvature radius direction" means a surface, out of two surfaces in a direction normal to the transparent screen 20, which is closer to the center of curvature.

The plurality of transparent plates 30, 40 are prepared by bending a plurality of transparent flat plates having different sizes of main surfaces into curved shapes on heating. The size of the main surface can be read as a size of a center plane in a plate thickness direction. Because there is only little tensile stress and compression stress applied to the center plane in a plate thickness direction when the transparent plates are bent in curved shapes, the size of the center plane in the plate thickness direction little changes before and after the bending.

In the first cross section, illustrated in FIG. 2, the transparent screen 20 has a curved shape, and a length of a center line in the plate thickness direction 31 of the transparent plate 30 on an exterior side in the curvature radius direction is greater than a length of a center line in the plate thickness direction 41 of the transparent plate 40 on an interior side in the curvature radius direction. A center line in a plate thickness direction is a line that bisects a plate in a plate thickness direction. The length of the center line in the plate thickness direction is measured along the center line in the plate thickness direction having a curved shape.

As a result, compared with the case of the plurality of transparent plates 130, 140 obtained by bending a plurality of transparent flat plates having main surfaces of the same size into curved shapes on heating, as illustrated in FIG. 1, end surfaces of the plurality of transparent plates 30, 40 can be aligned. Thus, while maintaining functions of both main surfaces of the transparent screen 20, in the same way as the case illustrated in FIG. 1, a size of a rear background viewable through the transparent screen 20 can be increased compared with the case illustrated in FIG. 1. Therefore, a sufficient size of a rear background viewable through the transparent screen 20 can be secured, and the transparent screen 20 can be held with stability.

In the first cross section, illustrated in FIG. 2, the transparent screen 20 has a curved shape, and a difference in extent between the end surfaces of the plurality of transparent plates 30, 40 is, for example, 5 mm or less (in FIG. 2, the difference is 0 mm). The difference in extent is measured along the screen main body 50 having the curved shape. In the first cross section, when the difference in extent is 5 mm or less, a sufficient size of rear background viewable through the transparent screen 20 can be secured, and the transparent screen 20 can be held with stability. In the first cross section, the size of the difference in extent is preferably 2 mm or less. The size of the difference in extent preferably falls within the above-described range over the entire outer periphery of the transparent screen 20.

In the second cross section illustrated in FIG. 3, the transparent screen 20 has a flat shape, and the lengths of center lines in the plate thickness direction 31, 41 of the plurality of transparent plates 30, 40 are the same. In the second cross section, the size of difference in extent between the end surfaces of the plurality of transparent plates 30, 40 is preferably 5 mm or less (in FIG. 3, the difference is 0 mm).

Note that although the transparent screen 20 according to the embodiment has a flat shape in the second cross section, the transparent screen 20 may have a curved shape in the same way as in the first cross section. In this case, in the second cross section, the length of the center line in the plate thickness direction of the transparent plate 30 on an exterior side in the curvature radius direction may be greater than the length of the center line in the plate thickness direction of the transparent plate 40 on an interior side in the curvature radius direction. Moreover, in this case, in the second cross section, the size of the difference in extent between the end surfaces of the plurality of transparent plates 30, 40 may be, for example, 5 mm or less, and preferably 2 mm or less.

Figure 4:
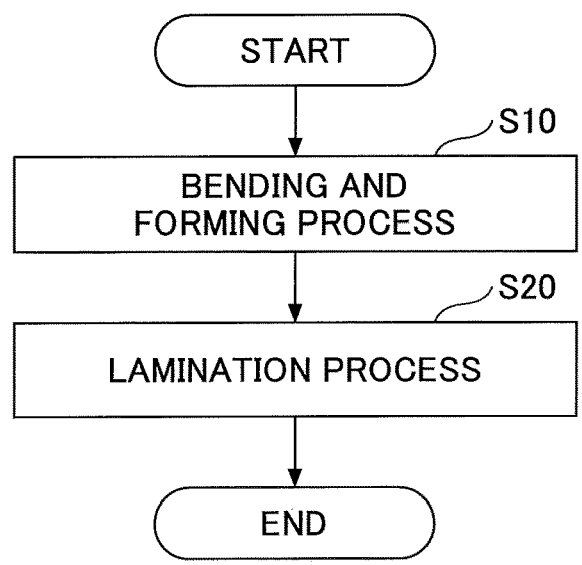
FIG. 4 is a flowchart depicting a manufacturing method of the transparent screen according to the embodiment.

FIG. 4 is a flowchart depicting a manufacturing method of a transparent screen according to the embodiment. The manufacturing method of the transparent screen 20 includes a bending formation process (step S10) and a laminating process (step S20).

In the bending formation process (step S10), a plurality of transparent flat plates are bent in curved shapes on heating, and thereby the plurality of transparent plates 30, 40 are prepared. The plurality of transparent flat plates may be laminated and bent simultaneously in curved shapes, or may be bent separately. For the bending formation, a gravity formation, a press formation or the like is used.

In the bending formation process (step S10), a glass surface may be strengthened by rapidly cooling a uniformly heated glass plate from a temperature around a softening temperature so as to generate a compression stress on a glass surface according to a difference between a temperature of the glass surface and a temperature inside the glass. A physically strengthened glass is obtained. Note that a chemically strengthened glass is obtained by generating a compression stress on a glass surface according to an ion exchange process or the like, after the bending formation process (step S10) and before the laminating process (step S20).

In the laminating process (step S20), the plurality of transparent plates 30, 40 are laminated via the screen main body 50. The screen main body 50 may have adhesion layers on both ends in the laminating direction, and may be fixed to the transparent plate 30 by an adhesion force. Note that the screen main body 50 may be deposited on any one of the plurality of transparent plates 30, 40.

In the laminating process (step S20), typically, after holding the screen main body 50 with the plurality of transparent plates 30, 40, heating and pressuring processes are performed using an autoclave. Before the heating and pressuring processes using the autoclave, a degassing process for degassing using a vacuum bag or the like, or a clamping process for clamping using pressing rolls or the like may be performed. Moreover, the degassing process or the clamping process may be performed under a heating condition. In the laminating process (step S20), when a laminated body is formed so that stress is not concentrated at an end portion of the laminated body, a deformation of an end portion of the screen main body 50 can be controlled and distortion of projected video images can be reduced, and it is preferable.

In the bending formation process (step S10), the plurality of transparent plates 30, 40 are prepared by bending a plurality of transparent flat plates having different sizes of main surfaces into curved shapes on heating. The sizes of the main surfaces of the transparent flat plates are adjusted in advance so that the end surfaces of the plurality of transparent plates 30, 40 are aligned after the bending formation process (step S10). Thus, it becomes possible to reduce time and labor in processing, such as in cutting, grinding, or chamfering, and it also becomes possible in some cases to eliminate the time-labor of these processes. Note that the time-labor in processing a flat plate is markedly less than the time-labor in processing a curved plate. Moreover, by eliminating processing after the laminating process (step S20), the screen main body 50 can be prevented from being damaged.

Figure 5:
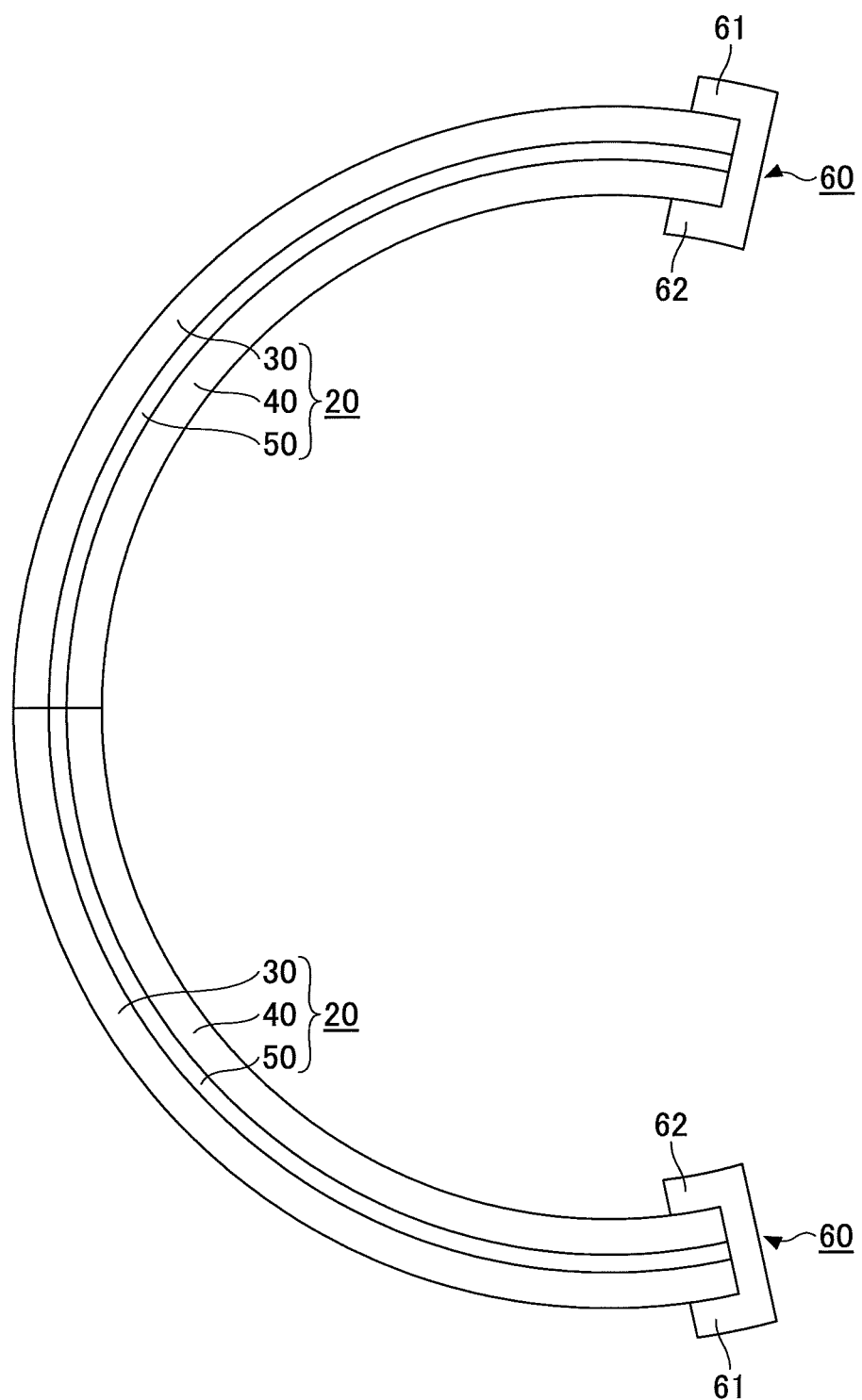
FIG. 5 is a cross-sectional view depicting a transparent screen assembly according to the embodiment.

FIG. 5 is a cross-sectional view depicting a transparent screen assembly according to the embodiment. The transparent screen assembly includes a plurality of transparent screens 20, and a holding member 60 that successively holds the plurality of transparent screens 20.

Each of the transparent screens 20 has a curved shape. In a cross section orthogonal to a part of an outer edge of each of the transparent screens 20, the plurality of curved transparent screens 20 are arranged successively.

According to the embodiment, on the outer periphery of each of the transparent screens 20, as described above, end surfaces of the plurality of transparent plates 30, 40 are aligned. Thus, there is little gap between the adjacent transparent screens 20. Therefore, there is little interference of video light leaked from gaps on both sides of the transparent screens, and blurring of video images is not observed. Moreover, when curvatures of the adjacent transparent screens 20 are the same, the transparent screens 20 are connected to each other smoothly, the blurring of video images is further controlled.

Figure 6:
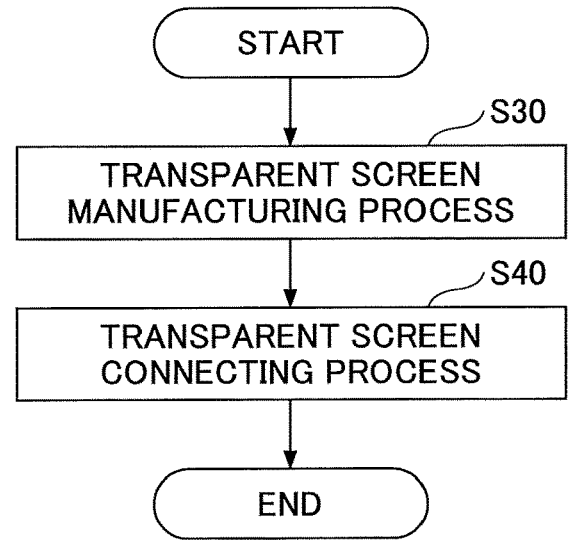
FIG. 6 is a flowchart depicting a manufacturing method of a screen assembly according to the embodiment.

FIG. 6 is a flowchart depicting a manufacturing method of a screen assembly according to the embodiment. The manufacturing method of the screen assembly includes a transparent screen manufacturing process (step S30) and a transparent screen connecting process (step S40).

In the transparent screen manufacturing process (step S30), a plurality of transparent screens 20 are manufactured. The manufacture of transparent screens 20 is performed by the bending formation process step S10 and the laminating process S20, illustrated in FIG. 4.

In the transparent screen connecting process (step S40), the plurality of transparent screens 20 are connected successively. For the connection, the holding member 60 is used.

Figure 7:
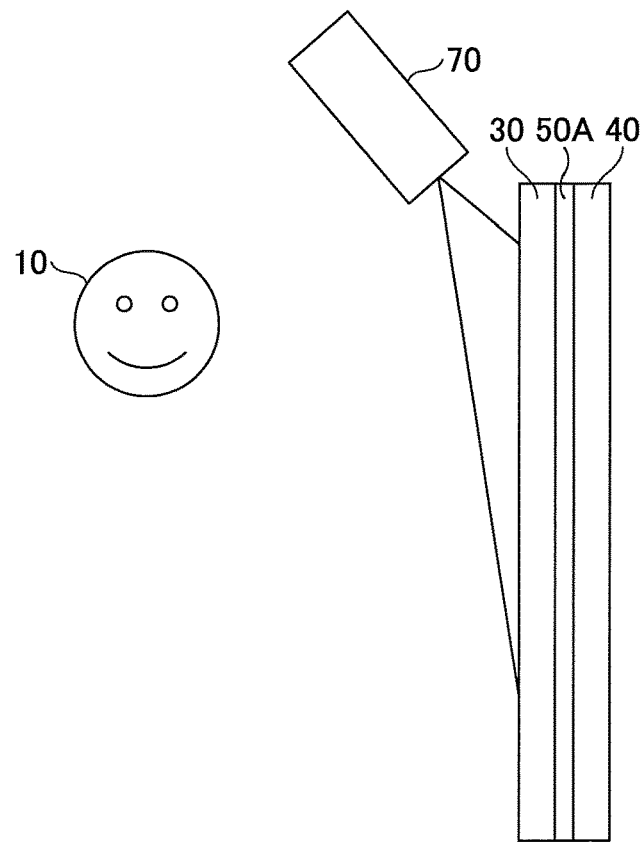
FIG. 7 is a cross-sectional view depicting a reflection-type transparent screen according to the embodiment.

FIG. 7 is a cross-sectional view depicting a reflection-type transparent screen according to the embodiment. The reflection-type transparent screen displays video images projected from a projector 70 on the front side of the screen to the user 10 on the front side, and enable a rear background to be visually recognized by the user 10. The reflection-type transparent screen includes a screen main body 50A interposed between the plurality of transparent plates 30, 40.

Figure 8:
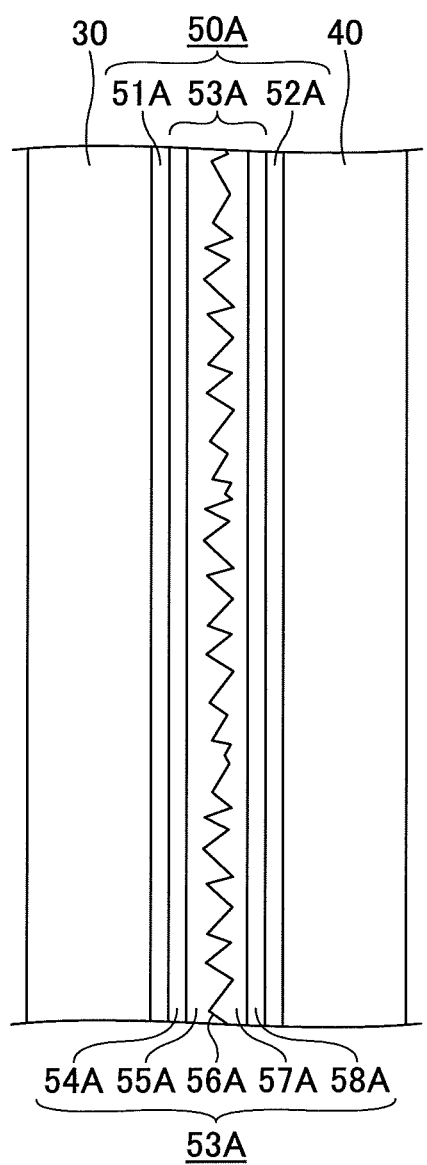
FIG. 8 is a cross-sectional view depicting in detail a reflection-type screen main body illustrated in FIG. 7.

FIG. 8 is a cross-sectional view illustrating in detail the reflection-type screen main body illustrated in FIG. 7. The screen main body 50A includes, for example, a plurality of adhesion layers 51A, 52A and a screen sheet 53A interposed between the plurality of adhesion layers 51A, 52A.

In FIG. 8, a plate thickness of the transparent plate 30 and a plate thickness of the transparent plate 40 can each be selected as desired according to strength of the screen assembly or design property. A thickness of the adhesion layer 51A and a thickness of the adhesion layer 52A are not limited, respectively, and preferably fall within a range of, for example, 0.01 to 1.5 mm, and more preferably fall within a range of 0.05 to 0.5 mm. A thickness of the screen sheet 53A can be set as desired depending on the manufacturing method of the screen sheet 53A, a visibility for projected video images, or the like, and preferably fall within a range of, for example, 0.02 to 1.5 mm.

The plurality of adhesion layers 51A, 52A, bond the plurality of transparent plates 30, 40 with the screen sheet 53A. One adhesion layer 51A bonds one transparent plate 30 with the screen sheet 53A, and the other adhesion layer 52A bonds the other transparent plate 40 with the screen sheet 53A. The adhesion layers 51A, 52A are formed of, for example, a thermoplastic resin, a thermosetting resin, or an ultraviolet curable resin. The adhesion layers 51A, 52A are preferably formed of one or more selected from a vinyl polymer, an ethylene-vinyl monomer copolymer, a styrene copolymer, a polyurethane resin, a urethane acrylate resin, a fluorinated resin, and an acrylic resin. The thermoplastic resin includes typically a polyvinyl butyral resin (PVB), an ethylene-vinyl acetate copolymer (EVA). The thermosetting resin includes typically a urethane acrylate resin. In the case of the thermoplastic resin or the thermosetting resin, the bonding is performed by a thermal process. In the case of the ultraviolet curable resin, the bonding is performed by an irradiation with ultraviolet rays. The urethane acrylate resin can cure by ultraviolet rays.

According to the embodiment, compared with the case illustrated in FIG. 1, because the end surfaces of the plurality of transparent plates 30, 40 are aligned, in the laminating process (step S20), a dilamination due to a change in temperature in the laminating process (step S30) can be controlled against. The dilamination includes at least one dilamination of a dilamination between one transparent plate 30 and the screen sheet 53A and a dilamination between the other transparent plate 40 and the screen sheet 53A. Because the dilamination can be controlled against, it becomes possible to control against generation of bubbles, and to control against disturbance in video images.

The reason why the aforementioned dilamination can be controlled against when the end surfaces of the plurality of transparent plates 30, 40 are aligned is that a bonding state of one adhesion layer 51A and a bonding state of another adhesion layer 52A transition to the same degree when the temperature varies in the laminating process (step S20). The bonding states of the respective adhesion layers 51A, 52A vary according to expansion and contraction of the respective layers. The respective adhesion layers 51A, 52A expand with a rise in temperature and contract with a fall in temperature. Moreover, the respective adhesion layers 51A, 52A contract according to a reaction or the like of resin compositions when the layers are heated.

Assume the case where, as illustrated in FIG. 1, there is a great difference in extent D between the end surfaces of the plurality of transparent plates 130, 140; and, the end surface of the transparent plate 130, which is on an exterior side in the curvature radius direction, and the end surface of the screen main body are aligned. In this case, with a rise in temperature, an adhesion layer protrudes from the transparent plate 130 that is an object to be bonded, but another adhesion layer does not protrude from the transparent plate 140 that is an object to be bonded. Thus, the bonding state of one adhesion layer and the bonding state of another adhesion layer are not likely to transition to the same degree. Therefore, a stress that is asymmetric with respect to the center plane in the plate thickness direction of the transparent screen is liable to occur, and a dilamination easily occurs.

Note that at a time before the rising in temperature in the laminating process (step S20), the adhesion layer 51A is arranged at an inner position relative to the outer edge of the transparent plate 30 that is an object to be bonded, thus it is possible to control the protrusion of the adhesion layer 51A from the outer edge of the transparent plate 30 when the adhesion layer 51A expands. Therefore, when the adhesion layer 51A contracts afterwards, drawn in air between the transparent plate 30 and the screen sheet 53A can be restricted, and it is possible to suppress generation of bubbles. The adhesion layer 51A may be processed into a size smaller than the transparent plate 30 before holding the screen main body 50A with the plurality of transparent plates 30, 40. But, the adhesion layer 51A is preferably processed into a size smaller than the transparent plate 30 after holding the screen main body 50A with the plurality of transparent plates 30, 40. The adhesion layer 51A may be processed by moving a cutter along an oblique surface formed in a boundary portion between the main surface and the end surface on the transparent plate 30.

Similarly, before the rising in temperature, in the laminating process (step S20), the adhesion layer 52A is arranged at a position inner than the outer edge of the transparent plate 40 that is an object to be bonded, it is possible to control the protrusion of the adhesion layer 52A from the outer edge of the transparent plate 40 when the adhesion layer 52A expands. Therefore, when the adhesion layer 52A contracts afterwards, involving air between the transparent plate 40 and the screen sheet 53A can be restricted, and it is possible to suppress generation of bubbles. The adhesion layer 52A may be processed into a size smaller than the transparent plate 40 before holding the screen main body 50A with the plurality of transparent plates 30, 40. But, the adhesion layer 52A is preferably processed into a size smaller than the transparent plate 40 after holding the screen main body 50A with the plurality of transparent plates 30, 40. The adhesion layer 52A may be processed by moving a cutter along an oblique surface formed in a boundary portion between the main surface and the end surface on the transparent plate 40.

The screen sheet 53A is not required to have flexibility, but preferably has flexibility. When the screen sheet 53A has flexibility, the screen sheet 53A can be bent to be deformed along the transparent plates 30, 40. The screen sheet 53A includes a base material 54A, an irregular layer 55A, a reflection film 56A, a covering layer 57A, and a protection sheet 58A, in this order. FIG. 8 illustrates the base material 54A on the left and the protection sheet 58A on the right. However, the base material 54A may be on the right and the protection sheet 58A may be on the left. A total thickness of the irregular layer 55A, the reflection film 56A and the covering layer 57A can be selected as desired depending on a manufacturing method, and preferably falls within a range of 1 to 100 μm, for example. Thicknesses of the base material 54A and the protection sheet 58A can be selected as desired depending on the manufacturing method, respectively, and preferably fall within a range of 0.01 to 0.5 mm, for example, and more preferably fall within a range of 0.05 to 0.3 mm. Note that the protection sheet 58A may not be present and the adhesion layer may be formed on the covering layer 57A.

The base material 54A may be any one of a glass sheet and a resin sheet. But in terms of flexibility, the resin sheet is preferable. The resin sheet is formed of, for example, a polycarbonate, a PET (polyethylene terephthalate), a PEN (polyethylene naphthalate), a cycloolefin polymer, or a polyester.

The irregular layer 55A is formed on the base material 54A, and has an irregular pattern on a surface opposite to the base material 54A. The irregular layer 55A may be formed of a resin. A formation method of the irregular layer 55A includes, for example, use of an imprint method. For a resin material in the imprint method, any of a light curing resin, a thermoplastic resin and a heat curing resin may be used. For a mold used in the imprint method, a resin sheet, a glass sheet or a metal sheet can be used. The irregular pattern on the mold is formed by an etching, a sandblast, an extrusion molding, or the like.

The reflection film 56A is formed along the irregular pattern on the surface of the irregular layer 55A. The reflection film 56A reflects a part of light incident from the front side to the front side, and transmits a part of light incident from the rear side to the front side. The reflection film 56A may be formed of, for example, a metal, a metal oxide, or a metal nitride. For a formation method of the reflection film 56A, for example, a vacuum deposition method or a sputtering method may be used. For a metal material in the vacuum deposition method or the sputtering method, for example, aluminum (Al) or silver (Ag) may be used.

The covering layer 57A embeds the irregular pattern of the reflection film 56A. The covering layer 57A may be formed of a resin, and is preferably formed of the same resin as the irregular layer 55A.

The protection sheet 58A covers the covering layer 57A. The protection sheet 58A may be any one of a transparent glass sheet and a transparent resin sheet. But in terms of flexibility, the transparent resin sheet is preferable. The resin sheet is formed of, for example, a polycarbonate, a PET, a PEN, a cycloolefin polymer, or a polyester.

Note that the irregular layer 55A according to the embodiment is formed on the base material 54A. However, the irregular layer 55A may be formed on any one of the plurality of transparent plates 30, 40. Moreover, the covering layer 57A according to the embodiment is covered with the protection sheet 58A. However, the covering sheet 57A may be covered with another one of the plurality of transparent plates 30, 40. In this case, the plurality of adhesion layers 51A, 52A, the base material 54A and the protection sheet 58A are not required.

Note that the irregular structure of the irregular layer 55A may be, in addition to the structure illustrated in FIG. 8, a micro lens array, a hologram, or the like.

As optical characteristics of the reflection type transparent screen, the transmittance is preferably 5% or more and 90% or less, the reflectance is preferably 5% or more and 70% or less, and the forward haze is preferably 20 or less. The transmittance, the reflectance and the forward haze are measured by using the D65 light source defined in JIS Z8720 (2012) "standard illuminant (standard light) for color measurement and standard light source", respectively.

Figure 9:
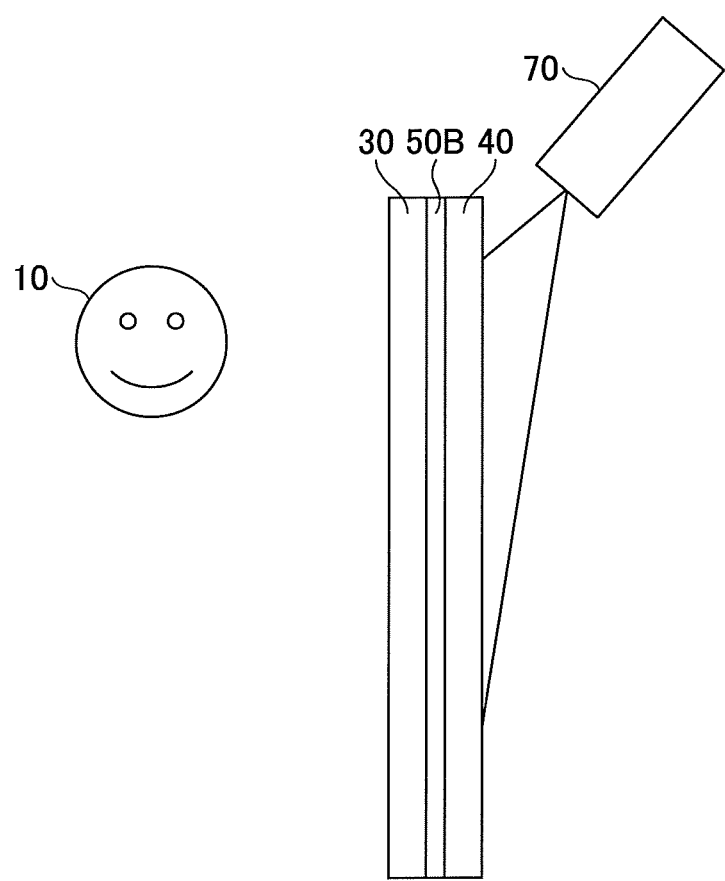
FIG. 9 is a cross-sectional view depicting a transmission-type transparent screen according to the embodiment.

FIG. 9 is a cross-sectional view depicting the transmission type transparent screen according to the embodiment. The transmission type transparent screen displays video images projected from a projector 70 on the rear side of the screen to a user 10 on the front side, and enables a rear background to be visually recognized by the user 10. The transmission type transparent screen includes a screen main body 50B interposed between a plurality of transparent plates 30, 40.

Figure 10:
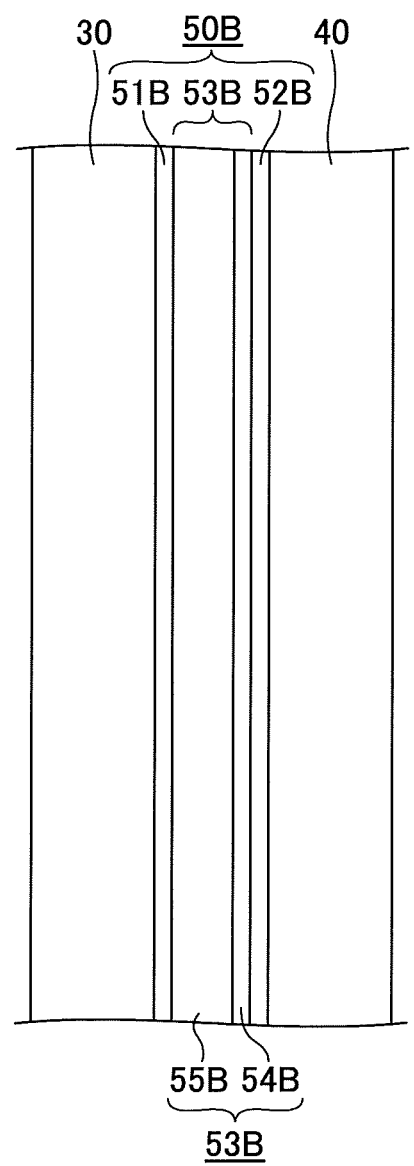
FIG. 10 is a cross-sectional view depicting in detail a transmission-type screen main body illustrated in FIG. 9.

FIG. 10 is a cross-sectional view depicting in detail the transmission-type screen main body illustrated in FIG. 9. The screen main body 50B includes, for example, a plurality of adhesion layers 51B, 52B, and a screen sheet 53B interposed between the plurality of adhesion layers 51B, 52B.

In FIG. 10, a plate thickness of the transparent plate 30 and a plate thickness of the transparent plate 40 can be selected as desired according to strength of the screen assembly or design property, respectively. A thickness of the adhesion layer 51B and a thickness of the adhesion layer 52B are not limited, respectively, and preferably fall within a range of, for example, 0.01 to 1.5 mm, and more preferably fall within a range of 0.05 to 0.5 mm. A thickness of the screen sheet 53B can be set as desired depending on the manufacturing method of the screen sheet 53B, a visibility for projected video images, or the like, and preferably fall within a range of, for example, 0.02 to 1.2 mm.

The plurality of adhesion layers 51B, 52B, bond the plurality of transparent plates 30, 40 with the screen sheet 53B. One adhesion layer 51B bonds one transparent plate 30 with the screen sheet 53B, and the other adhesion layer 52B bonds the other transparent plate 40 with the screen sheet 53B. For the adhesion layers 51B, 52B, the same layers as the adhesion layers 51A, 52A, described with reference to FIG. 8, can be used. The adhesion layers 51B, 52B are the same as the adhesion layers 51A, 52A, including also the preferable embodiment.

The screen sheet 53B is not required to have flexibility, but preferably has flexibility. When the screen sheet 53B has flexibility, the screen sheet 53B can be bent deformed along the transparent plates 30, 40. The screen sheet 53B includes a base material 54B, and a light scattering layer 55B. FIG. 10 illustrates the base material 54B on the right and the light scattering layer 55B on the left. However, the base material 54B may be on the left and the light scattering layer 55B may be on the right. A thickness of the light scattering layer 55B can be selected as desired depending on a manufacturing method of the light scattering layer 55B, and preferably falls within a range of 1 to 200 μm, for example. A thicknesses of the base material 54B can be selected as desired depending on the manufacturing method of the base material 54B, and preferably falls within a range of 0.01 to 0.5 mm, for example, and more preferably falls within arrange of 0.05 to 0.3 mm.

The base material 54B may be any one of a glass sheet and a resin sheet. But in terms of flexibility, the resin sheet is preferable. The resin sheet is formed of, for example, a polycarbonate, a PET, a PEN, or a cycloolefin polymer. Especially, a PET or a PEN is preferable on the point that a wrinkle or a distortion due to a bending stress is not likely to occur when the transparent screen having a curved shape is manufactured.

The light scattering layer 55B includes a transparent resin and a light scattering material. For the transparent resin used in the light scattering layer 55B, a light curing resin such as an acrylic resin or an epoxy resin, a heat curing resin, a thermoplastic resin or the like can be used. For the light scattering material, fine particles of a high refractive index material such as titanium oxide (refractive index falls within a range of 2.5 to 2.7), zirconium oxide (refractive index is 2.4), or aluminum oxide (refractive index is 1.76), fine particles of a low refractive index material such as porous silica (refractive index is 1.25 or less), or hollow silica (refractive index is 1.25 or less), a resin material having a low compatibility with the aforementioned transparent resin and a refractive index different from that of the aforementioned transparent resin, a crystallized resin material including crystals with a size of 1 μm or less, or the like can be used. A fraction of the light scattering material occupied in the light scattering layer 55B is, for example, 0.01 volume percent or more and 5 volume percent or less, and is preferably 0.05 volume percent or more and 1 volume percent or less.

The light scattering layer 55B may further include a light absorbing material. For the light absorbing material, a carbon black, a titanium black or the like can be used. A fraction of the light absorbing material occupied in the light scattering layer 55B is, for example, 0.01 volume percent or more and 5 volume percent or less, and is preferably 0.1 volume percent or more and 3 volume percent or less. The light absorbing material can enhance a contrast of video images displayed on the screen main body 50B.

Figure 11:
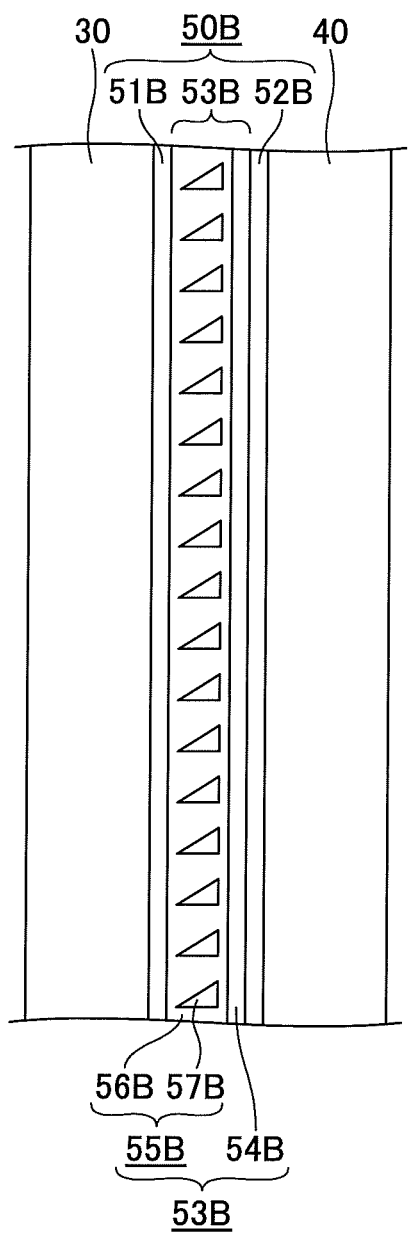
FIG. 11 is a cross-sectional view depicting a transmission-type transparent screen according to a variation.

Note that the light scattering layer 55B may be a layer, illustrated in FIG. 11, in which a plurality of light scattering parts 57B are arranged at intervals in a transparent resin part 56B. This arrangement is referred to as a louver structure. The light scattering part 57B includes a light scattering material and a transparent resin. In the transparent resin part 56B, the same material as the transparent material used in the light scattering layer 55B, illustrated in FIG. 10, can be used.

Note that the light scattering layer 55B according to the embodiment is formed on the base material 54B. But the light scattering layer 55B may be formed on any one of the plurality of transparent plates 30, 40. Moreover, the light scattering layer 55B according to the embodiment is covered with the adhesion layer. But the light scattering layer 55B may be covered with another one of the plurality of transparent plates 30, 40. In this case, the plurality of adhesion layers 51B, 52B, and the base material 54B are not required.

As optical characteristics of the transmission-type transparent screen, the transmittance is preferably 5% or more and 90% or less, the forward haze is preferably 4 or more and 40 or less, and the rear haze is preferably 0 or more and 60 or less. The transmittance, the forward haze and the rear haze are measured by using the D65 light source defined in JIS 28720 (2012) "standard illuminant (standard light) for color measurement and standard light source", respectively.

As described above, embodiments and the like of the transparent screen have been described. The present invention is not limited to the embodiments or the like. Various variations and enhancements may be made without departing from the scope of the present invention.

For example, the transparent screen according to the aforementioned embodiment includes two transparent plates. However, the transparent screen may include three or more transparent plates.

Moreover, the reflection type screen main body 50A according to the aforementioned embodiment includes the adhesion layers 51A, 52A and the screen sheet 53A. But the screen main body may include other functional layers.

Similarly, the transmission type screen main body 50B according to the aforementioned embodiment includes the adhesion layers 51B, 52B and the screen sheet 53B. But the screen main body may include other functional layers.

The functional layers include, for example, an antireflection layer having a solid shape or a layer configuration for reducing reflection of light, a light attenuation layer for attenuating a part of light, an infrared ray shielding layer for preventing infrared ray from transmitting through the screen main body, and the like. In the configuration of the reflection type screen main body 50A or the transmission type screen main body 50B, one layer or two or more layers of the functional layer may be present at any position. Moreover, two or more different functional layers may be present.

REFERENCE SIGNS LIST 10 user
20 transparent screen
30 transparent plate
40 transparent plate
50 screen main body
50A reflection type screen main body
51A adhesion layer
52A adhesion layer
53A screen sheet
54A base material
55A irregular layer
56A reflection film
57A covering layer
58A protection sheet
50B transmission type screen main body
51B adhesion layer
52B adhesion layer
53B screen sheet
54B base material
55B light scattering layer
60 holding member
61 exterior side surface holding part
62 interior side surface holding part

What is claimed is:

1. A transparent screen, comprising:
a front glass plate;
a rear glass plate positioned with respect to the front glass plate such that the front and rear glass plates are laminated in a front-rear direction; and
a screen main body interposed between the front and rear glass plates and comprising a plurality of adhesion layers and a screen sheet interposed between the plurality of adhesion layers such that the screen main body is configured to display a video image projected from a rear side of the screen main body to a user on the front side of the screen main body and enable a rear background to be visually recognized through the screen main body by the user,
wherein the screen sheet of the screen main body includes a light scattering layer comprising a transparent resin and light scattering material particles, the front and rear glass plates and the screen main body have a curved shape in a cross section orthogonal to outer edge portions of the front and rear glass plates, and the front and rear glass plates are formed such that a length of a center line in a plate thickness direction of one of the front and rear glass plates on an external side of the screen main body in a curvature radius direction of the curved shape is greater than a length of a center line in a plate thickness direction of the other one of the front and rear glass plates on an internal side of the screen main body in the curvature radius direction.

2. The transparent screen according to claim 1, wherein the front and rear glass plates are formed such that a difference between end surfaces of the front and rear glass plates is 5 mm or less in the cross section.

3. The transparent screen according to claim 2, wherein the front and rear glass plates are formed such that the front and rear glass plates have a flat shape in a cross section orthogonal to other edge portions of the front and rear glass plates.

4. The transparent screen according to claim 2, wherein at least one of the front and rear glass plates is the glass plate comprising a strengthened glass.

5. The transparent screen according to claim 2, wherein the screen main body is formed such that the screen sheet has a thickness in a range of 0.02 to 1.2 mm.

6. The transparent screen according to claim 2, wherein the screen main body is formed such that the light scattering layer has a thickness in a range of 1 to 200 µm.

7. The transparent screen according to claim 2, wherein the screen main body is formed such that the screen sheet includes a base material and the light scattering layer.

8. The transparent screen according to claim 2, wherein the screen main body is formed such that the light scattering layer includes a light absorbing material.

9. The transparent screen according to claim 1, wherein the front and rear glass plates are formed such that a difference between end surfaces of the front and rear glass plates is 2 mm or less in the cross section.

10. The transparent screen according to claim 1, wherein the front and rear glass plates are formed such that the front and rear glass plates have a flat shape in a cross section orthogonal to other edge portions of the front and rear glass plates.

11. The transparent screen according to claim 1, wherein at least one of the front and rear glass plates is the glass plate comprising a strengthened glass.

12. The transparent screen according to claim 1, wherein the screen main body is formed such that the screen sheet has a thickness in a range of 0.02 to 1.2 mm.

13. The transparent screen according to claim 1, wherein the screen main body is formed such that the light scattering layer has a thickness in a range of 1 to 200 μm.

14. The transparent screen according to claim 1, wherein the screen main body is formed such that the screen sheet includes a base material and the light scattering layer.

15. The transparent screen according to claim 1, wherein the screen main body is formed such that the light scattering layer includes a light absorbing material.

16. The transparent screen according to claim 15, wherein the screen main body is formed such that a fraction of the light absorbing material in the light scattering layer is in a range of 0.01 volume percent to 5 volume percent.

17. The transparent screen according to claim 1, wherein the transparent screen has a transmittance in a range of 5% to 90%, a forward haze in a range of 4 to 40, and a rear haze in a range of 0 to 60.

18. A transparent screen assembly, comprising:
the transparent screen of claim 1 in a plurality; and
a holding member configured to hold the plurality of transparent screens successively.

19. A manufacturing method of a transparent screen assembly, comprising:
manufacturing the transparent screen of claim 1 in a plurality; and
holding the plurality of transparent screen using a holding member configured to hold the plurality of transparent screens successively such that the plurality of transparent screens is connected successively.

20. A manufacturing method of a transparent screen, comprising:
heating and bending a flat front glass plate such that a front glass plate having a curved shape in a cross section orthogonal to an outer edge portion of the front glass plate is formed;
heating and bending a flat rear glass plate such that a rear glass plate having a curved shape in a cross section orthogonal to an outer edge portion of the rear glass plate is formed; and
laminating the front and rear glass plates and a screen main body comprising a plurality of adhesion layers and a screen sheet interposed between the adhesion layers such that the adhesion layers are adhering the screen main body to the front and rear glass plates respectively, that the screen main body is interposed between the front and rear glass plates and that the front and rear glass plates and the screen main body have a curved shape in a cross section orthogonal to the outer edge portions of the front and rear glass plates,
wherein the screen main body is configured to display a video image projected from a rear side of the screen main body to a user on the front side of the screen main body and enable a rear background to be visually recognized through the screen main body by the user, the screen sheet of the screen main body includes a light scattering layer comprising a transparent resin and light scattering material particles, and the flat front and rear glass plates are formed such that a length of a center line in a plate thickness direction of one of the front and rear glass plates on an external side of the screen main body in a curvature radius direction of the curved shape is greater than a length of a center line in a plate thickness direction of one of the front and rear glass plates on an internal side of the screen main body in the curvature radius direction.

* * * * *